United States Patent [19]

White

[11] Patent Number: 4,934,894
[45] Date of Patent: Jun. 19, 1990

[54] PERSONAL VEHICLE CARRIER MOUNTED ON AN AUTOMOBILE

[76] Inventor: Ralph H. White, 755 McClure Rd., Aurora, Ill. 60504

[21] Appl. No.: 282,532

[22] Filed: Dec. 12, 1988

Related U.S. Application Data

[63] Continuation-in-part of Ser. No. 64,492, Jun. 22, 1987, abandoned.

[51] Int. Cl.⁵ .............................................. B60R 09/06
[52] U.S. Cl. .................. 414/462; 224/42.08; 414/537
[58] Field of Search ............... 224/42.03 A, 42.03 B, 224/42.08; 414/462, 537, 921

[56] References Cited

U.S. PATENT DOCUMENTS

| | | | |
|---|---|---|---|
| 3,612,366 | 10/1971 | Schneider et al. | 414/462 X |
| 3,720,333 | 3/1973 | Vaughn | 414/462 |
| 3,913,811 | 10/1975 | Spencer | 224/42.08 |
| 4,213,729 | 7/1980 | Cowles et al. | 414/462 |
| 4,234,284 | 11/1980 | Hauff | 224/42.08 X |
| 4,476,959 | 10/1984 | Tortellier | 414/921 X |
| 4,697,975 | 10/1987 | Lippold | 414/462 |

Primary Examiner—Robert J. Spar
Assistant Examiner—Janice Krizek
Attorney, Agent, or Firm—Ernest Kettelson

[57] ABSTRACT

A carrier for a personal vehicle such as for a handicapped person which is mounted on an automobile to transport the personal vehicle from one place to another and which is so mounted that it pivots from a horizontal carrying position to an inclined ramp position for loading the personal vehicle thereon, and when the personal vehicle is not being carried the carrier is hinged to swing upwardly from the horizontal carrying position to a substantially vertical or upright position along the back wall of the automobile where it is substantially out of the way.

19 Claims, 8 Drawing Sheets

PERSONAL VEHICLE CARRIER MOUNTED ON AN AUTOMOBILE

PRIOR APPLICATION

This is a continuation-in-part of co-pending prior application Ser. No. 064,492 filed June 22, 1987, now abandoned.

BACKGROUND OF THE INVENTION

This invention relates to the field of carriers mounted on over-the-road vehicles for transport from one place to another of a smaller vehicle.

Prior art carriers in this field include those shown and described in the following U.S. patents.

U.S. Pat. No. 4,275,981 discloses a trough or channel wide enough for the wheels of a motorcycle carried on a pair of support arms behind a vehicle, the trough or channel being pivotable between a horizontal and diagonal position and including an extension to provide a ramp when in the diagonal position.

U.S. Pat. No. 4,234,284 discloses a utility platform mounted behind a vehicle on a central support beam on which the utility platform can be pivoted diagonally to raise and lower either end.

U.S. Pat. No. 4,189,274 discloses a narrow trough or channel for carrying two wheel cycles similar to that described in U.S. Pat. No. 4,275,981, the trough or channel being pivotable between a horizontal and a diagonal position and being slidable on the pivot from an off-center loading position to a centered carrying position, centered behind the vehicle on which it is mounted.

U.S. Pat. No. 3,921,842 discloses another motorcycle carrier mounted on an over-the-road vehicle, having a narrow channel member to receive the motorcycle wheels, and an extension pivotally connected to one end of the carrying channel to form a ramp when in the diagonal position and to pivot upwardly to provide a blocking barrier to keep the motorcycle in place on the carrying channel when being transported.

U.S. Pat. No. 3,913,811 discloses a carrier platform for carrying a small lawn type tractor behind an automobile, which is hinged to a cross bar so it may be swung from a horizontal carrying position to an upright out-of-the-way position but not pivoted to a laterally extending diagonal ramp position for loading and unloading the tractor.

U.S. Pat. No. 3,912,098 discloses another motorcycle carrier for mounting on the rear of a vehicle, having a narrow channel member to carry the cycle mounted on a pivot for pivoting between a diagonal and a horizontal position while extending laterally of the vehicle and including an extension piece to provide a ramp for rolling the cycle on to the carrying channel member, the extension piece being pivotally mounted at one end of the carrying member.

U.S. Pat. No. 3,796,333 discloses another carrier for two wheel cycles mounted in back of an automobile, the laterally extending carrying member being pivotable on a longitudinally extending pivot axis but not hinged to pivot upwardly on a laterally extending pivot axis. The carrying member for two wheel cycles is narrow enough that it is not as necessary to pivot upwardly to an out-of-the-way or storage position as is the case for a relatively wide carrying member for a three or four wheel vehicle to which the present invention is directed.

U.S. Pat. No. 3,724,694 discloses a carrier mounted in back of an automobile which is wide enough for a three or four wheel vehicle, pivotable laterally on a longitudinal pivot axis but not upwardly to an out-of-the-way storage position on a laterally extending pivot axis.

U.S. Pat. No. 3,720,333 discloses another carrier for two wheel cycles mounted behind another vehicle, pivotable laterally to a diagonal position on a longitudinally extending pivot axis which is centrally positioned and includes an extension piece which can be extended outwardly in a lateral direction to provide a ramp for rolling the cycle up on to the narrow channel carrying member.

U.S. Pat. No. 3,529,737 discloses another carrier for two wheel cycles mounted behind another vehicle, this one pivotable laterally on an offset longitudinal pivot axis but not pivotable upwardly on a laterally extending pivot axis.

The present invention is an improvement over the known prior art devices in a number of respects which will become apparent from the detailed description which follows, including the feature of the carrier platform being pivotable on a laterally extending pivot axis to an upright out-of-the-way position as well as being pivotable on a longitudinally extending pivot axis to a diagonal ramp or loading position. The longitudinally extending pivot axis of the carrier platform is furthermore offset from the center of the carrier platform and is closer to one end than the other, whereby a less steep incline is achieved without the need for an extension piece which many of the prior art carriers for two wheel cycles require.

SUMMARY OF THE INVENTION

It is an object of the invention to provide a carrier for a small vehicle which can be mounted behind a larger vehicle wherein the carrier is pivotable firstly between a horizontal carrying position and a diagonal ramp position on a longitudinally extending pivot axis and pivotable secondly between the horizontal carrying position and an upright out-of-the-way or storage position on a laterally extending pivot axis.

It is an object of the invention to provide a carrier for a small vehicle which can be mounted behind a larger vehicle wherein the carrier is pivotable both on a longitudinally extending pivot axis and a laterally extending pivot axis, and in which the longitudinally extending pivot axis is offset from the center of the carrier platform, closer to one end thereof than to the other.

It is an object of the invention to provide a carrier for a small vehicle which can be mounted behind a larger vehicle wherein the carrier is pivotable both on a longitudinally extending pivot axis and a laterally extending pivot axis, in which the carrier is pivotable on the longitudinally extending axis from the horizontal carrying position to a diagonal ramp or loading position in only one direction and includes stop means to prevent the carrier from pivoting beyond the horizontal carrying position in the opposite direction.

It is an object of the invention to provide a carrier for a small vehicle which can be mounted behind a larger vehicle wherein the carrier is pivotable both on a longitudinally extending pivot axis and a laterally extending pivot axis and wherein the carrier platform is of minimum weight construction including a metal mesh floor and a light weight peripheral frame whose ends are supported and reinforced by suspension cables along each opposite side, and wherein adjustable tensioning means are provided to increase the tension and reinforcing support of the suspension cables.

It is an object of the invention to provide a carrier for a small vehicle which can be mounted behind a larger vehicle wherein the carrier is pivotable both on a longitudinally extending pivot axis and a laterally extending pivot axis, and wherein the mounting assembly includes impact cushioning protective means comprising a roller or wheel with a cushioning resilient circumferential surface to prevent the carrier and mounting assembly from scraping the roadway surface.

DESCRIPTION OF PREFERRED EMBODIMENT

Figure 1:
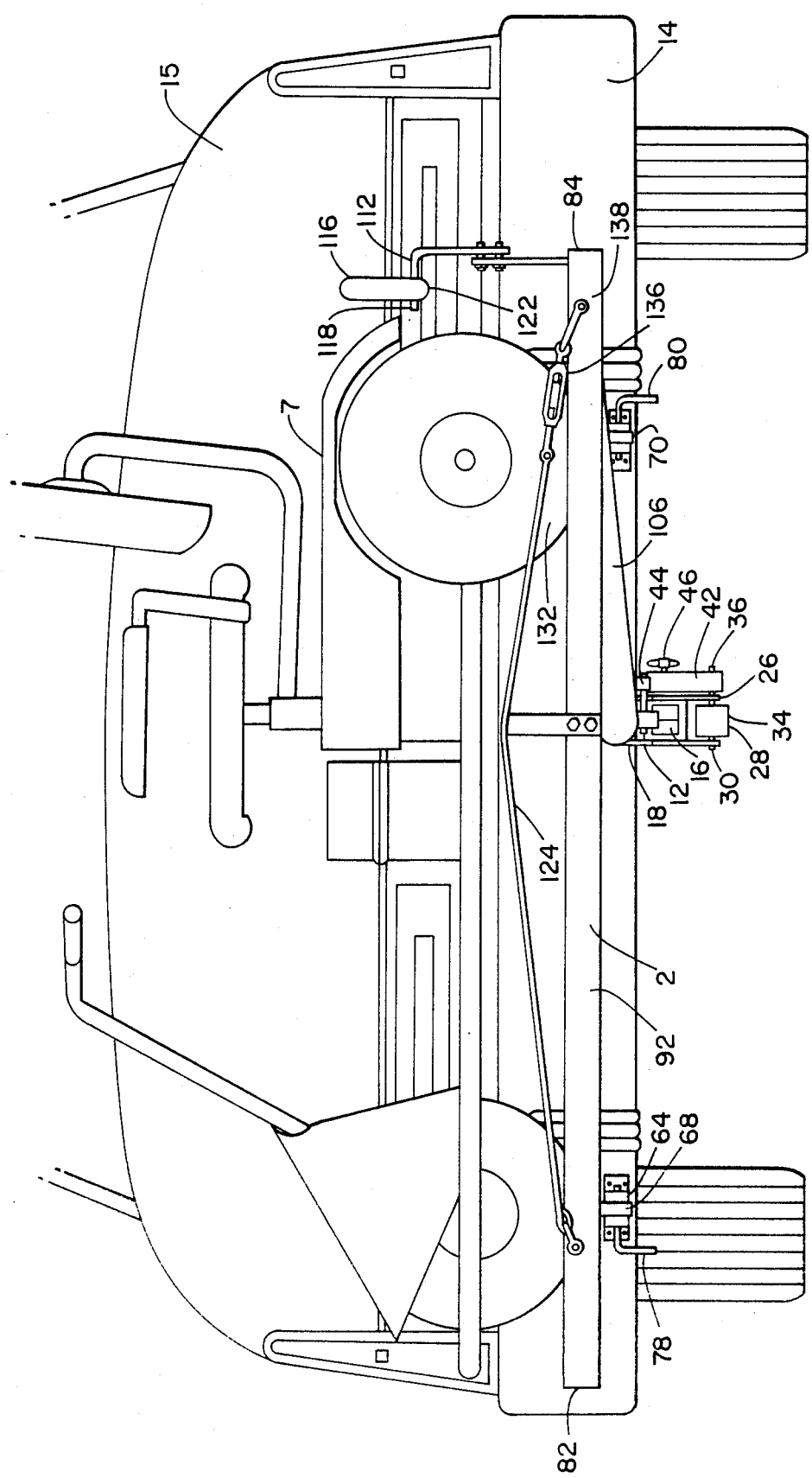
FIG. 1 is an elevation view of the carrier for a small personal vehicle in accordance with this invention mounted on the back of an automobile shown in its horizontal carrying position and showing a small personal vehicle being carried thereon.
Figure 2:
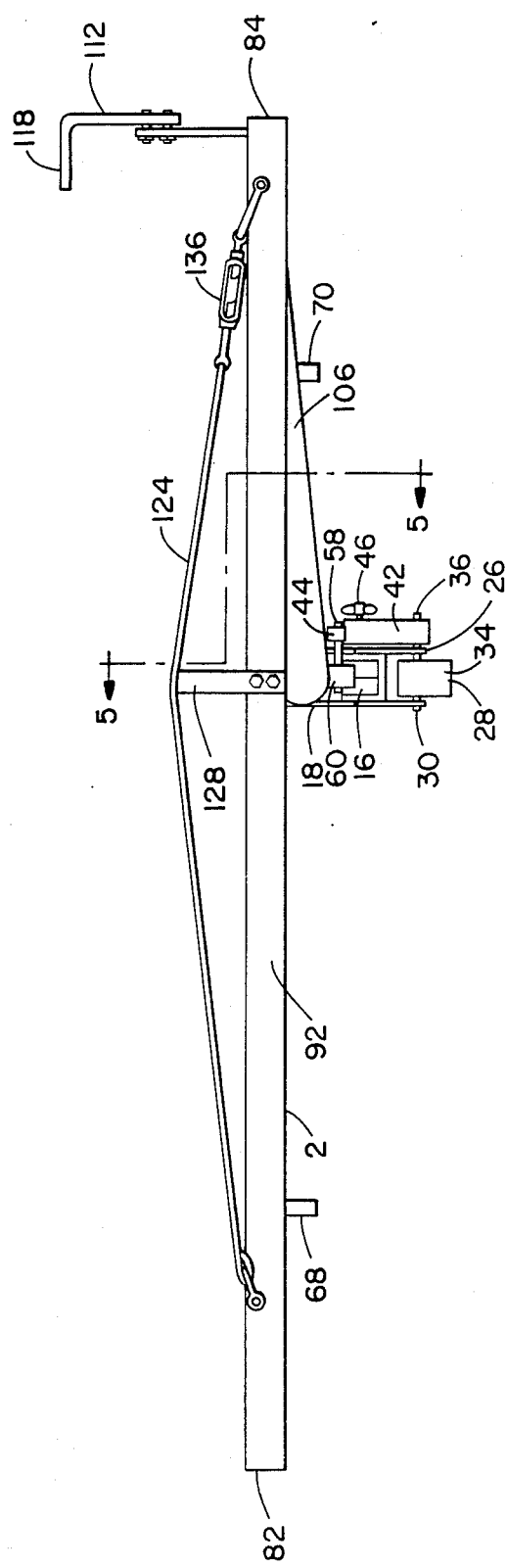
FIG. 2 is an elevation view of the carrier for a small personal vehicle shown in FIG. 1 but with the automobile and small personal vehicle removed.
Figure 3:
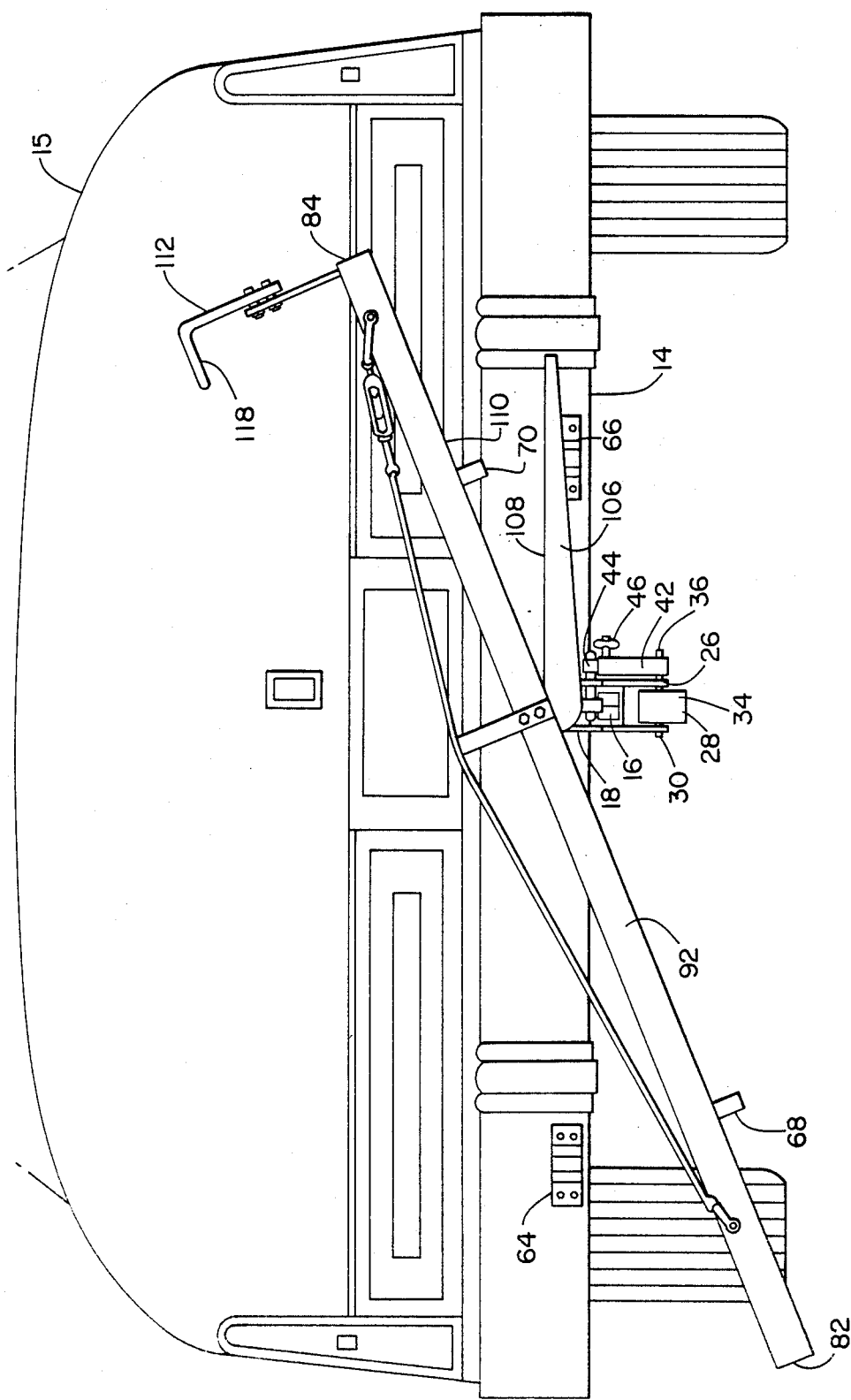
FIG. 3 is an elevation view of the carrier for a small personal vehicle of FIG. 1 shown in its diagonal ramp position with the small personal vehicle unloaded and removed from the carrier.
Figure 4:
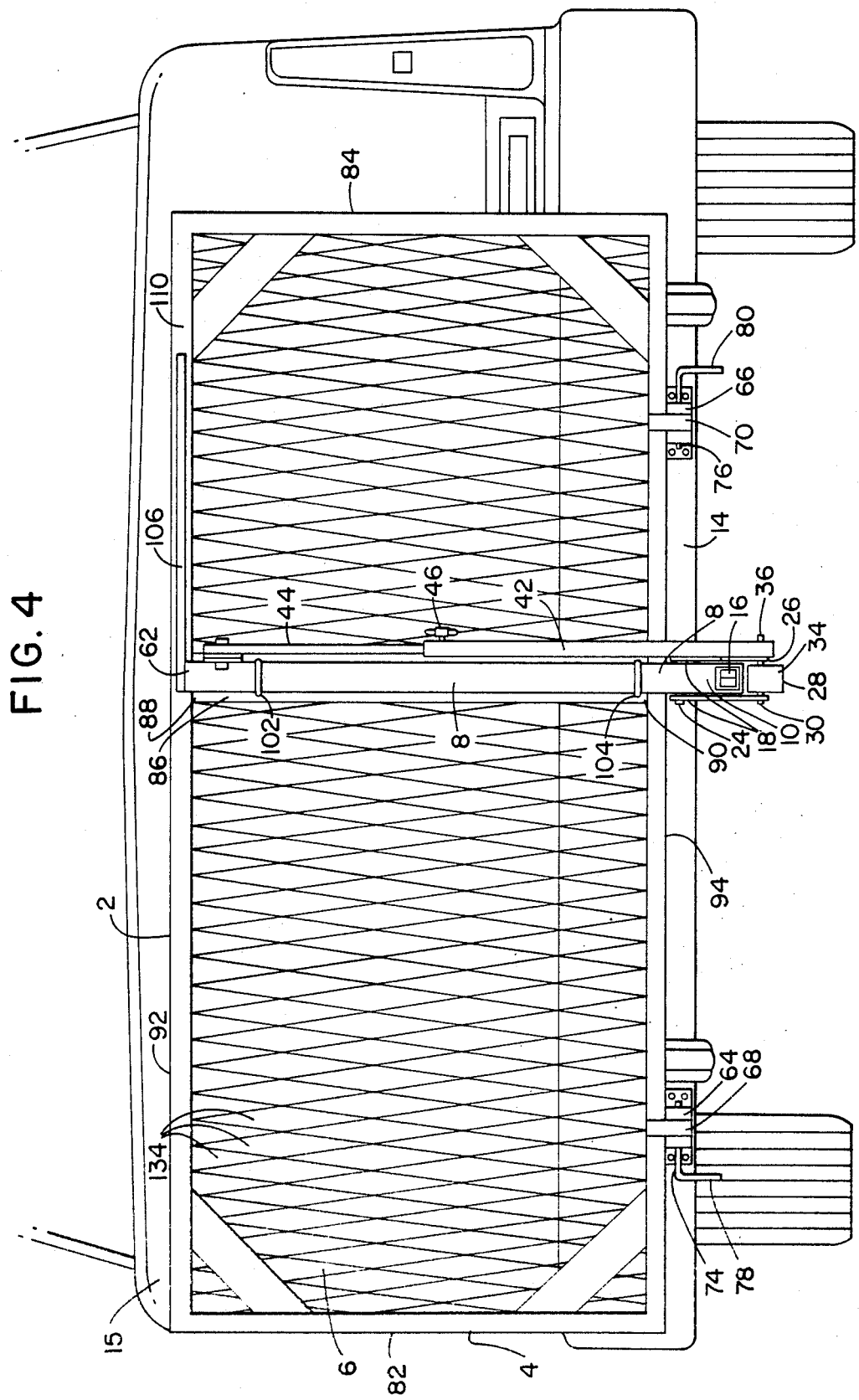
FIG. 4 is a bottom plan view of the carrier for a small personal vehicle of FIG. 1 shown in its upright, out-of-the-way position adjacent the back wall portion of the automobile.
Figure 5:
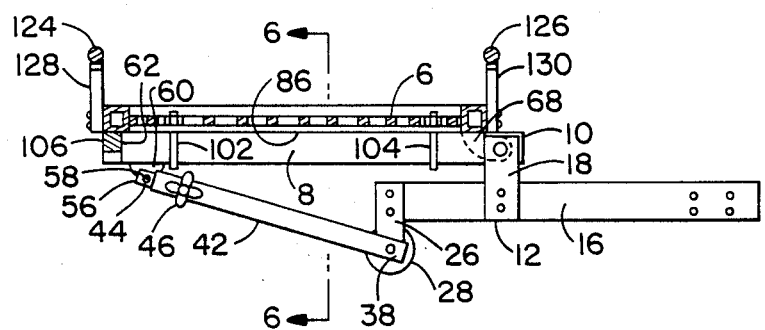
FIG. 5 is a section view taken on line 5—5 of FIG. 2.
Figure 6:
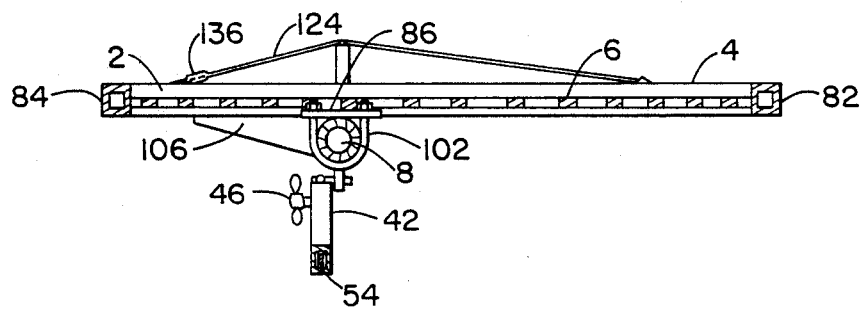
FIG. 6 is a section view taken on line 6—6 of FIG. 5.
Figure 7:
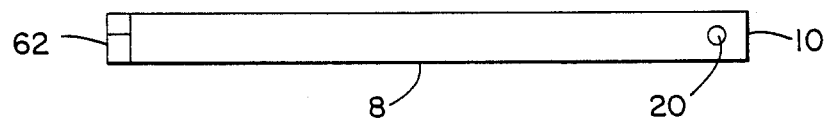
FIG. 7 is a side elevation view of the elongated cylindrical support member on which the carrier platform is mounted.
Figure 8:
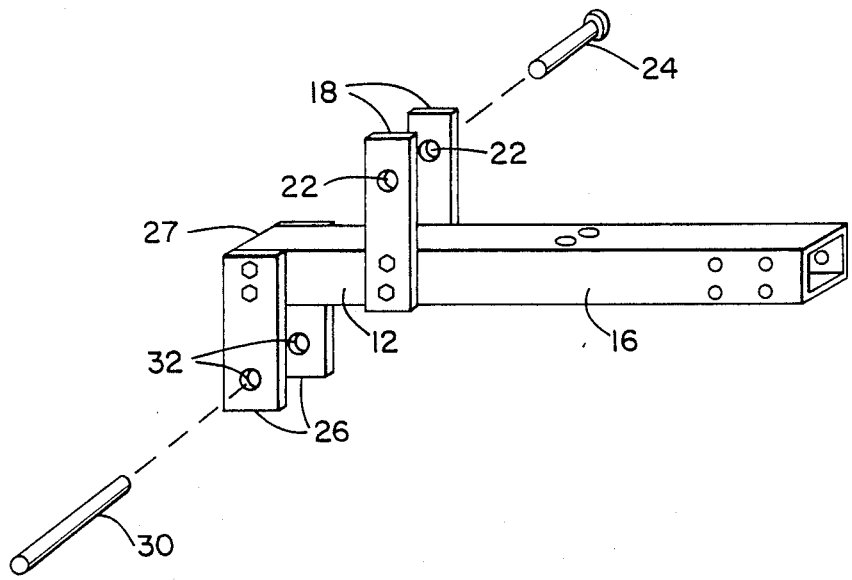
FIG. 8 is a perspective view of the carrier bracket assembly for mounting the carrier platform thereon and for securing to an appropriate frame portion of an automobile.
Figure 9:
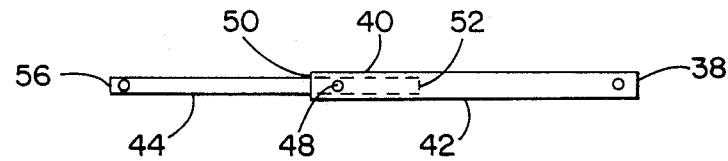
FIG. 9 is an elevation view of the telescoping support bar assembly of this invention with its insert member partially inserted into its tubular sleeve member.
Figure 10:
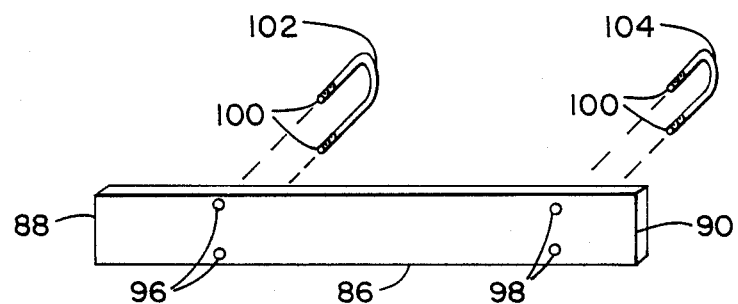
FIG. 10 is a perspective view of the mounting plate of this invention which is welded or otherwise affixed across the underside of the carrier platform to mount on the elongated cylindrical support member shown in FIG. 7.
Figure 11:
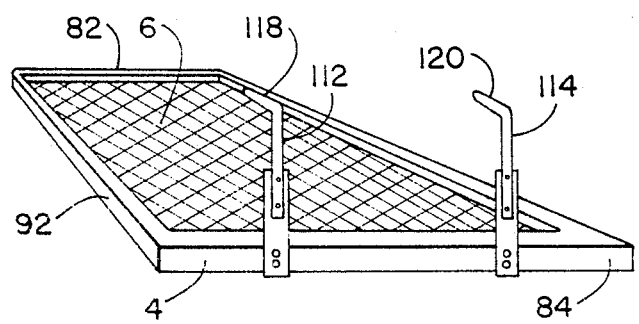
FIG. 11 is a perspective view of the carrier platform portion of this invention showing the tie bars at one end for securing the small personal vehicle in place when loaded on to the platform.

A carrier for a personal vehicle in accordance with this invention which is mounted on an automobile comprises a carrier platform 2 consisting of a rectangular metal frame 4 which supports a flat load bearing floor 6 for carrying a relatively small one person motorized vehicle 7 of the kind used by handicapped persons.

The carrier platform 2 is pivotally mounted on an elongated cylindrical support member 8, having its forwardly extending end 10 pivotally mounted to a carrier bracket assembly 12 which is bolted or welded to the bumper 14 and other frame members (not shown) of an automobile 15. The carrier bracket assembly 12 includes a rearwardly extending tubular bar member 16 supporting a pair of upwardly extending pivot arms 18 spaced apart to receive the forwardly extending end 10 of cylindrical support member 8 therebetween. The forwardly extending end 10 includes an aperture 20 in registration with apertures 22 through pivot arms 18 to receive pivot pin 24 therethrough to pivotally connect the cylindrical support member 8 to the carrier bracket assembly 12 for pivotal movement between a substantially horizontal carrying position and a substantially vertical or upright position.

The carrier bracket assembly 12 also includes a pair of downwardly extending arms 26, projecting downwardly from the free end 27 of tubular bar member 16, spaced apart to receive a protective impact cushioning wheel 28 therebetween rotatably mounted on an axle 30 extending through aligned apertures 32 in the downwardly extending arms 26. The impact cushioning wheel 28 includes a circumferential surface covering 34 of hard rubber or other comparable material which is both durable and somewhat resilient or compressible. The impact cushioning wheel 28 protects the free end 27 of bar member 16 from scraping on the surface of the roadway when going through valleys or dips in the roadway which cause the rear portion of the automobile to lower towards the surface of the road, and also to cushion against impact with the roadway surface on excessively bumpy roads.

One end 36 of the axle 30 extends laterally outwardly from one of the downwardly extending arms 26 far enough to pivotally receive thereon the forwardly extending pivot end 38 of a telescoping support bar 40, having tubular sleeve member 42 and slidable insert member 44. A lock nut 46 is threadedly received through a threaded tap 48 near the insert end 50 of tubular sleeve member 42 to tighten against a facing portion of slidable insert member 44 received therein, to hold insert member 44 and sleeve member 42 in fixed relationship when tightened and to permit relative sliding movement when loosened.

The slidable insert member 44 includes an insertable end 52 received through insert end 50 of tubular sleeve member 42 into its cavity 54, and a rearwardly extending pivot end 56 pivotally connected by pivot pin 58 to downwardly extending hinge plate 60 welded to the rearwardly extending end 62 of elongated cylindrical support member 8.

Slidable insert member 44 slides into cavity 54 of sleeve member 42 when the elongated cylindrical support member 8 is lowered to its substantially horizontal carrying position, and slides outwardly therefrom when such support member 8 is raised to its substantially vertical or upright position. Insert member 44 is long enough for an inserted portion thereof to be in registration with lock nut 46 when in its extended position with cylindrical support member 8 in its fully upright position, whereby lock nut 46 can be tightened against such inserted portion to hold in fixed relationship to sleeve member 42. The cylindrical support member 8 and platform 2 thereon can thus be locked in the upright out-of-the-way position when not in use.

When the cylindrical support member 8 and platform 2 are lowered to the substantially horizontal carrying position, the telescoping support bar 40 extends diagonally at an oblique angle to the support member 8 from its connection thereto by pivot pin 58 at the rearwardly extending end 62 of support member 8 to connection of telescoping support bar 40 at its opposite end 38 to end 36 of axle 30, to hold support member 8 and carrier platform 2 thereon in the substantially horizontal carrying position. The longitudinal dimension of the diagonally extending tubular sleeve member 42 is preferably sufficient to abut against pivot pin 58 at rearwardly extending end 62 of support member 8 when support member 8 and carrier platform 2 is in the substantially horizontal carrying position, at which time the slidable insert member 44 is fully received in the cavity 54 of the tubular sleeve member 42. With this construction it is not necessary to rely on lock nut 46 to hold insert member 44 and sleeve member 42 in fixed relationship and to hold the cylindrical support member 8 and carrier platform 2 from tilting downward from the substantially horizontal carrying position.

A pair of stabilizing hinge members 64 and 66 are bolted or otherwise secured to the bumper 14 of automobile 15 in spaced apart relationship to receive corresponding respective hinge plates 68 and 70 extending downwardly from the bottom of the lateral edge 94 of carrier frame 4. Hinge members 64 and 66 and hinge plates 68 and 70 include corresponding apertures to receive hinge pins 74 and 76 to pivotally connect the hinge 68 and 70 to the respective hinge members 64 and 66. The hinge pins 74 and 76 include angularly extending hand grip extensions 78 and 80 to enable a person to grasp and remove hinge pins 74 and 76 from hinge members 64 and 66 thereby disconnecting hinge plates 68 and 70 and the carrier platform 2 when it is desired to pivot carrier platform 2 on the cylindrical support member 8 from its substantially horizontal carrying position to a diagonal ramp position for loading the personal vehicle 7 on to the carrier platform 2.

The carrier platform 2 is mounted on the elongated cylindrical support member 8 as follows. Support member 8 extends rearwardly of the automobile 15 substantially in line with the longitudinal axis of the automobile 15 and substantially normal to the bumper 14, and is substantially the same length as the opposite short sides 82 and 84 of the rectangular carrier frame 4. A mounting plate 86 is welded or otherwise affixed at each of its opposite ends 88 and 90 to respective opposite long sides 92 and 94 of the rectangular carrier frame 4, at a location inwardly from the opposite short sides 82 and 84 but closer to short side 84 than to short side 82. The mounting plate 86 is wider than the diameter of cylindrical support member 8 which it overlies when the carrier platform 2 is mounted thereon, and includes a first pair of apertures 96 spaced apart laterally a distance corresponding to the diameter of cylindrical support bar 8 near end 88 of mounting plate 86 and a second pair of apertures 98 spaced apart laterally the same distance near the opposite end 90 of mounting plate 86, each to receive the free ends 100 of U-Bolts 102 and 104 which clamp cylindrical support member 8 to mounting plate 86 thereby securing carrier platform 2 to cylindrical support member 8 for pivotal movement thereon between the substantially horizontal carrying position of carrier platform 2 and a diagonally extending ramp or loading position in which the end or short side 82 of carrier platform 2 farthest from the connection to cylindrical support member 8 is lowered to the ground.

The carrier platform 2 is held in the substantially horizontal carrying position and against rotation on the cylindrical support member 8 by stabilizing hinge members 64 and 66 on the bumper 14 to which hinge plates 68 and 70 on the carrier platform 2 are connected by hinge pins 74 and 76. A stop bar 106 is rigidly connected to the rearwardly extending end 62 of elongated cylindrical support member 8 and extends normal thereto with its upper surface 108 in a horizontal plane, coplanar with the bottom surface 110 of the metal frame 4 of carrier platform 2 along its rearward long side 92 when in its said substantially horizontal carrying position, the stop bar 106 extending in a direction toward the short side 84 to which the mounting plate 86 and cylindrical support member 8 is closest. Thus, when the carrier platform 2 is pivoted from the diagonal ramp position to the horizontal carrying position, the bottom surface 110 of that part of metal frame 4 between mounting plate 86 and short side or end 84 along the rearward long side 92 thereof comes downward and abuts against the rigid horizontally extending stop bar 106 to prevent further rotational movement of the carrier platform 2 once it has reached the horizontal carrying position. At such time the apertures of the hinge plates 68 and 70 are in registration with the apertures through hinge members 64 and 66 secured to the bumper 14. Hinge pins 74 and 76 are then inserted to hold the carrier platform 2 against rotation in either direction on the cylindrical support member 8.

A pair of tie bars 112 and 114 extend upwardly from the frame 4 along its end or short side 84 for cooperative engagement with a frame portion 116 of the one person motorized vehicle 7 when carried on the carrier platform 2, to secure and hold the vehicle 7 from movement on the carrier platform 2 when so engaged therewith. The upwardly extending tie bars 112 and 114 each include a horizontally extending leg portion 118 and 120 projecting at a right angle in the direction toward the opposite end or short side 82 of the carrier platform 2. When the vehicle 7 is in place on the carrier platform 2, the horizontal leg portions 118 and 120 of the tie bars 112 and 114 extend over the laterally extending bar 122 of the vehicle frame 116 to hold it solidly to the floor 6 of the carrier platform 2 and prevent it from bouncing upwardly during transport.

The carrier platform 2 also includes reinforcing cables 124 and 126 along each opposite long side 92 and 94, connected at each end to frame 4 at each corresponding short side 82 and 84 and raised at an intermediate location by upwardly extending cable supports 128 and 130, secured to frame 4 along each long side 92 and 94 at the location where the opposite ends 88 and 90 of mounting plate 86 are welded or otherwise affixed to the respective long sides 92 and 94 of the frame 4. The reinforcing cables 124 and 126 thus extend in a triangular configuration with their respective long sides 92 and 94 of the frame 4, to help keep the end regions adjacent short sides 82 and 84 of the carrier platform 2 from sagging and to maintain the floor 6 of carrier platform 2 in a planar horizontal position.

When the carrier in accordance with the present invention is not in use, the lock nut 46 is loosened to permit insert member 44 of the telescoping support bar 40 to slide freely in sleeve member 42. The cylindrical support member 8 and carrier platform 2 are then pivoted upwardly to the upright position in substantially parallel relationship with the rear wall of the automobile 15. The lock nut 46 is then tightened to hold the insert member 44 of telescoping support bar 40 from movement relative to sleeve member 42 which thereby holds the carrier platform 2 in such upright out-of-the-way position when not in use.

When the personal vehicle 7 is to be carried, lock nut 46 is loosened to enable the carrier platform 2 and cylindrical support member 8 to pivot downwardly to the horizontal carrier position at which time insert member 44 is fully received in the cavity 54 of sleeve member 42 of the telescoping support 40, and the insert end 50 of tubular sleeve member 42 abuts against the pivot pin 58 at the rearwardly extending end 62 of support member 8 thereby preventing further travel downwardly of the carrier platform 2.

The hinge pins 74 and 76 are then removed to disconnect hinge plates 68 and 70 from hinge members 64 and 66, whereupon the carrier platform 2 can be pivoted on the cylindrical support member 8 to the diagonal ramp position in which the end or short side 82 of the carrier platform 2 is lowered to the ground. The small personal vehicle 7 is then preferably backed up on the carrier platform 2 in its diagonal ramp position until the rear wheels 132 of the vehicle 7 pass over the cylindrical support member 8. The center of gravity then begins to shift toward the opposite end or short side 84 of the carrier platform 2 causing it to begin to pivot back toward the horizontal carrying position as the vehicle 7 moves backward thereon toward the opposite end 84. The vehicle 7 moves backward on carrier platform 2 until the cross bar 122 of its frame 116 engages and is stopped by the tie bars 112 and 114, at which time the carrier platform has reached its horizontal carrying position and has been stopped from further rotation in that direction by the stop bar 106 as described above.

At this time the apertures of hinge plates 68 and 70 on the carrier platform 2 are in registration with the apertures through hinge members 64 and 66 on the automobile bumper 14. Hinge pins 74 and 76 are inserted to connect the hinge plates 68 and 70 to their respective hinge members 64 and 66 and to thereby hold the carrier platform 2 and the personal vehicle 7 thereon in the horizontal position for transporting the vehicle 7 to a desired location.

The lock nut 46 is again tightened to prevent any relative movement of the now fully inserted insert member 44 and the sleeve member 42 of telescoping support bar 40. When the slidable members 42 and 44 of telescoping support bar 40 are held rigidly in place one relative to the other, that also holds the cylindrical support member 8 to which telescoping support bar 40 is connected and carrier platform 2 rigidly in position.

To move the personal vehicle 7 off of the carrier platform 2, the procedure described above for mounting on to the carrier platform 2 is reversed, after which the carrier platform 2 may then be pivoted to its out-of-the-way upright position as described above.

The floor 6 of the carrier platform 2 may be metal mesh having a plurality of openings 134 therethrough for lighter weight and to permit rain, ice, dirt and debris to fall through rather than accumulate and build up.

The cables 124 and 126 may be tightened to provide increased reinforcing support for each end 82 and 84 of the carrier platform 2 and to keep them from sagging under load by means of the turnbuckles 136 connected at one end thereof to each cable 124 and 126 and at their opposite end to the frame at or near end region 138 of end 84 the carrier platform 2.

I claim:

1. A carrier for a small personal vehicle attached to a larger over the road vehicle for transport, comprising a carrier platform, said carrier platform having first pivot means on a first axis of rotation to pivot said carrier platform between a substantially horizontal position for carrying said small personal vehicle thereon and an upright position, second pivot means on a second axis of rotation extending normal to said first axis of rotation to pivot said carrier platform between said substantially horizontal position and a diagonal ramp position for loading said small personal vehicle on to said carrier platform, and operable holding means operable to hold said carrier platform in said substantially horizontal position and from rotation on said second axis of rotation for carrying said small personal vehicle thereon and to release said carrier platform for pivotal movement on said second axis of rotation from said substantially horizontal position, said first pivot means including at least one pivot member, said operable holding means including said one pivot member of said first pivot means.

2. A carrier for a small personal vehicle attached to a larger over the road vehicle for transport, comprising a carrier platform, first pivot means to pivot said carrier platform between a substantially horizontal position for carrying said small personal vehicle thereon and an upright position, second pivot means to pivot said carrier platform between said substantially horizontal position and a diagonal ramp position for loading said small personal vehicle on to said carrier platform, and operable holding means operable to hold said carrier platform in said substantially horizontal position for carrying said small personal vehicle thereon and to release said carrier platform for pivotal movement from said substantially horizontal position, wherein said carrier platform is elongated having two opposite side edges longer than its two opposite end edges, including said two opposite side edges comprising a first side edge and a second side edge and said two opposite end edges comprising a first end edge and a second end edge, said first pivot means includes a first hinge member positioned along one of said edges having an axis of rotation extending in a first direction, said carrier platform includes a floor bounded by said side edges and said end edges, said floor including a planar upper surface lying in a substantially horizontal plane when said carrier platform is in said substantially horizontal position, said second pivot means includes a pivot member positioned adjacent said floor having a pivot axis extending in a direction substantially normal to said axis of rotation of said hinge member, said pivot member being located relative to said floor in a position farther from said first end edge of said carrier platform than from said second end edge thereof, said first end edge being pivoted downwardly and said second end edge being pivoted upwardly when said pivot member pivots said carrier platform to said diagonal ramp position, said operable holding means including stop means to prevent said first end edge of said carrier platform from pivoting upwardly beyond said substantially horizontal plane and said second end edge thereof from pivoting downwardly below said substantially horizontal plane when said pivot member pivots said carrier platform from said diagonal ramp position to said substantially horizontal position.

3. A carrier for a small personal vehicle attached to a larger over the road vehicle for transport as set forth in claim 2, wherein said stop means includes a stop bar member positioned and supported to engage a portion of said carrier platform between the location of said pivot member and said second end edge of said carrier platform when said carrier platform reaches said substantially horizontal position to thereby prevent said second end edge thereof from pivoting downwardly below said substantially horizontal plane in which said planar surface of said floor of said carrier platform lies when said carrier platform has reached said substantially horizontal position.

4. A carrier for a small personal vehicle attached to a larger over the road vehicle for transport as set forth in claim 2, wherein said operable holding means includes lock means to releasably lock said carrier platform from pivotal movement in either direction of rotation on said pivot member of said second pivot means when said carrier platform has been pivoted to said substantially horizontal position.

5. A carrier for a small personal vehicle attached to a larger over the road vehicle for transport as set forth in claim 4, wherein said lock means includes said first hinge member of said first pivot means, said first hinge member being positioned along said first side edge of said carrier platform at a location closer to one of said end edges thereof than to its other end edge, a second hinge member being positioned along said first side edge of said carrier platform spaced apart from said first hinge member, cooperative first and second hinge connecting members in spaced apart relationship on said larger vehicle in registration with respective ones of said first and second hinge members of said carrier platform when said carrier platform is pivoted to said substantially horizontal position, and releasable connectors to releasably connect said first hinge member to said first hinge connecting member and to releasably connect said second hinge member to said second hinge connecting member.

6. A carrier for a small personal vehicle attached to a larger over the road vehicle for transport as set forth in claim 1, wherein said second pivot means includes a pivot member coaxial with said second axis of rotation, wherein said pivot member of said second pivot means is elongated having a cylindrical cross section and a cylindrical peripheral wall surface, said carrier platform is mounted on said cylindrical pivot member for said pivotal movement between said substantially horizontal position and said diagonal ramp position, said elongated cylindrical pivot member extending longitudinally in the direction of the longitudinal axis of said larger vehicle and including a forwardly extending pivot end and a rearwardly extending free end, a cooperative pivot connecting member on said larger vehicle for pivotal connection on said first axis of rotation to said forwardly extending pivot end of said elongated cylindrical pivot member, a pivot connecter to pivotally connect said pivot end of said elongated cylindrical pivot member to said pivot connecting member on said larger vehicle to permit said elongated cylindrical pivot member of said second pivot to pivot on said first axis of rotation with said carrier platform when it is pivoted between said substantially horizontal position and said upright position on said hinge member of said first pivot means pivoting on said first axis of rotation.

7. A carrier for a small personal vehicle attached to a larger over the road vehicle for transport as set forth in claim 6, including a diagonal support bar member having a rearwardly extending first end and a forwardly extending second end, said rearwardly extending first end of said diagonal support bar member being connected to said elongated cylindrical pivot member adjacent its said rearwardly extending free end, a support bar connecting member on said larger vehicle for connection to said forwardly extending second end of said support bar member, a support bar connector to so connect, said support bar connecting member being located on said larger vehicle at a position below where said cooperative pivot connecting member is located on said larger vehicle, whereby said diagonal support bar member extends diagonally at an oblique angle to said elongated cylindrical pivot member when its first end is connected to said rearwardly extending free end of said elongated cylindrical pivot member and its second end is connected to said support bar connecting member on said larger vehicle, the length of said diagonally extending support bar member being sufficient when so connected to support said elongated cylindrical pivot member in said substantially horizontal position.

8. A carrier for a small personal vehicle attached to a larger over the road vehicle for transport as set forth in claim 7, wherein said diagonal support bar member includes a telescoping bar assembly including a first tubular sleeve member having an elongated cavity therein opening to an insert end thereof and a second insert member having an insert end slidably receivable into said cavity of said sleeve member, including a lock nut in said sleeve member projecting into its said cavity for locking engagement with said insert member therein to hold it rigidly against movement relative to said sleeve member when said lock nut is tightened thereagainst.

9. A carrier for a small personal vehicle attached to a larger over the road vehicle for transport as set forth in claim 8, wherein said second insert member is substantially fully received in said elongated cavity of said sleeve member when said carrier platform and said elongated cylindrical pivot member are in said substantially horizontal position and the length of said sleeve member being sufficient when in such position to reach between said connection of said diagonal support bar member comprised of said telescoping bar assembly to said rearwardly extending free end of said elongated cylindrical pivot member and said connection thereof to said support bar connecting member on said larger vehicle, the said sleeve member being in bearing engagement at its said insert end to support said elongated cylindrical pivot member in said substantially horizontal position, the said sleeve member of said telescoping bar assembly including and terminating at said forwardly extending second end of said diagonal support bar member connected to said support bar connecting member on said larger vehicle, said insert member of said telescoping bar assembly including and terminating at said rearwardly extending first end of said diagonal support bar member connected to said rearwardly extending free end of said cylindrical pivot member.

10. A carrier for a small personal vehicle attached to a larger over the road vehicle for transport as set forth in claim 6, wherein said carrier platform is elongated having two opposite side edges longer than its two opposite end edges including said two opposite side edges comprising a first side edge and a second side edge and said two opposite end edges comprising a first end edge and a second end edge, said carrier platform includes a floor bounded by said side edges and said end edges, said second pivot means extending entirely across said carrier platform from said first side edge to said second side edge to fully support and hold the entire span of said carrier platform thereon, said second pivot means including a mounting plate extending laterally across said carrier platform below said floor from said first side edge to said second side edge, the width of said mounting plate being greater than the cross-sectional dimension of said elongated cylindrical pivot member of said second pivot means, said mounting plate overlying said elongated cylindrical pivot member when said carrier platform is mounted thereon, a pair of U-bolts to rotationally connect said elongated cylindrical pivot member to said mounting plate for said pivotal movement of said carrier platform between its said substantially horizontal position and its said diagonal ramp position.

11. A carrier for a small personal vehicle attached to a larger over the road vehicle for transport as set forth in claim 3, said pivot member being elongated and extending laterally from said first side edge to said second side edge of said carrier platform terminating at a free end adjacent said second side edge of said carrier platform, said stop bar member being rigidly connected to said free end of said pivot member and extending therefrom laterally in the direction toward said second end edge of said carrier platform and horizontally to engage the facing portion of said carrier platform between the location of its connection to said pivot member and the second end edge of said carrier platform as the second end edge of the carrier platform pivots downwardly from said diagonal ramp position to its said substantially horizontal position and to stop further downward pivotal movement thereof when it reaches said substantially horizontal position.

12. A carrier for a small personal vehicle attached to a larger over the road vehicle for transport as set forth in claim 5, wherein said first and second hinge members comprise first and second hinge plates projecting outwardly from said first side edge of said carrier platform, said first and second hinge connecting members comprise first and second hinge bearing members, each having a pair of bearing walls spaced apart a distance corresponding to the thickness of said respective hinge plates to receive respective ones thereof between said pair of bearing walls, said hinge plates each having an aperture therethrough, said bearing walls of said bearing members each having an aperture therethrough in registration with said aperture through said hinge plates when received between said bearing walls of respective ones of said first and second hinge bearing members.

13. A carrier for a small personal vehicle attached to a larger over the road vehicle for transport as set forth in claim 12, wherein said releasable connectors to releasably connect said hinge plates of said first and second hinge members to said hinge bearing members of said first and second hinge connecting members include a pair of hinge pins, each of said hinge pins including a hand grasp portion to enable removal of said hinge pins from said apertures through said hinge plates and said bearing walls of said hinge bearings and reinsertion of said pins therethrough without use of a tool.

14. A carrier for a small personal vehicle attached to a larger over the road vehicle for transport as set forth in claim 8, including a substantially horizontal connecting bar on said larger vehicle attached to a frame portion thereof and extending longitudinally and rearwardly thereof, said cooperative pivot connecting member for pivotally connecting said forwardly extending pivot end of said elongated cylindrical pivot member being secured to said rearwardly extending connecting bar and extending upwardly therefrom, said support bar connecting member for connecting said forwardly extending second end of said diagonal support bar member being secured to said rearwardly extending connecting bar and extending downwardly therefrom, said downwardly extending support bar connecting member being positioned at the rearwardly extending terminating end of said rearwardly extending connecting bar, said upwardly extending cooperative pivot connecting member being positioned forwardly thereof on said rearwardly extending connecting bar.

15. A carrier for a small personal vehicle attached to a larger over the road vehicle for transport as set forth in claim 14, wherein said downwardly extending support bar connecting member includes a pair of downwardly extending wheel bearing wall members spaced apart a distance corresponding to the width of a small diameter impact cushioning wheel, an axle extending between said spaced apart wheel bearing wall members, said impact cushioning wheel being rotatably mounted on said axle, said axle and wheel being supported on said wheel bearing wall members a sufficient distance above the surface of the roadway to avoid contact therewith during normal driving conditions and to when necessary cushion against impact with the roadway surface during an occasional abnormal condition as well as to prevent scraping contact with the roadway surface of said rearwardly extending connecting bar at such abnormal condition times, said small diameter impact cushioning wheel having a circumferential contact surface of durable resilient material.

16. A carrier for a small personal vehicle attached to a larger over the road vehicle for transport as set forth in claim 15, wherein said axle extends outwardly from one of said wheel bearing wall members to provide an offset axle portion for pivotal connection thereto of said forwardly extending second end of said diagonal support bar member comprising said telescoping bar assembly, said second end thereof being pivotally connected to said outwardly extending offset axle portion, whereby when said carrier platform is pivoted to its said upright position on said first pivot means said telescoping bar assembly is free to pivot upwardly with its said insert member free to slide outwardly as the rearwardly extending first end of said telescoping bar assembly connected to said rearwardly extending free end of said elongated cylindrical pivot member is drawn farther from its said forwardly extending second end during said pivotal movement of said carrier platform and as said elongated cylindrical pivot member is pivoted from said substantially horizontal position toward said upright position.

17. A carrier for a small personal vehicle attached to a larger over the road vehicle for transport as set forth in claim 1, wherein said carrier platform includes a metal mesh floor having a plurality of openings therethrough for lighter weight and to avoid accumulation of debris.

18. A carrier for a small personal vehicle attached to a larger over the road vehicle for transport as set forth in claim 1, wherein said carrier platform includes a peripheral frame having a pair of spaced apart elongated sides extending straight in substantially parallel relationship, each terminating at opposite ends thereof, a reinforcing support member extending upwardly from each of said spaced apart elongated sides and located at an intermediate position thereof inwardly from each opposite end region of said carrier platform, a reinforcing cable on each side extending between and connected between said opposite end regions along each of said spaced apart sides of said frame, each of said reinforcing cables extending upwardly to and supported by said upwardly extending support member on each side to form a triangular pattern with said elongated straight sides of said frame and to help hold each opposite end region of said carrier platform and frame in a substantially straight horizontal plane and from sagging when under load, and tensioning means to tighten each of said cables and increase the reinforcing support of each of said opposite end regions of said carrier platform.

19. A carrier for a small personal vehicle attached to a larger over the road vehicle for transport as set forth in claim 18, wherein said tensioning means includes a turnbuckle on each side connected between each of said cables and a corresponding end region of said carrier platform.

* * * * *